J. W. RICHARDS.
ELECTRODE.
APPLICATION FILED MAY 12, 1913.
1,088,296.
Patented Feb. 24, 1914.
2 SHEETS—SHEET 1.
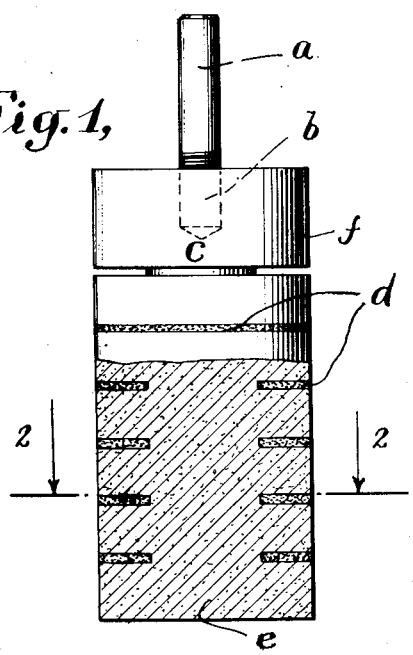
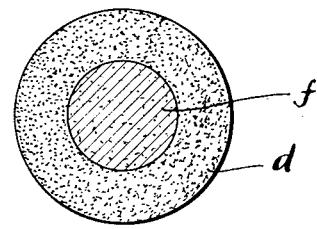
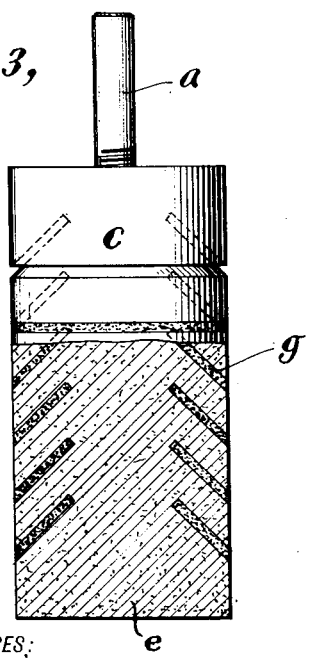
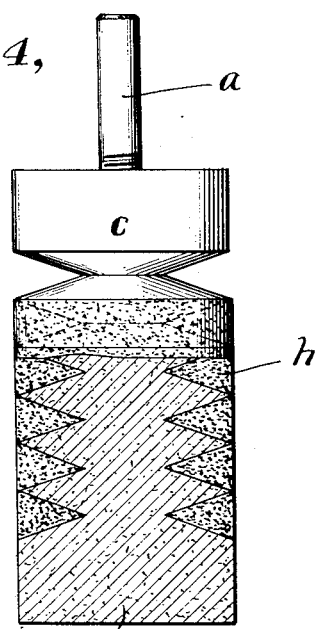
WITNESSES:
INVENTOR:
Joseph W. Richards
BY
ATTORNEYS.

J. W. RICHARDS.
ELECTRODE.
APPLICATION FILED MAY 12, 1913.
1,088,296.
Patented Feb. 24, 1914.
2 SHEETS—SHEET 2.
Fig. 5,
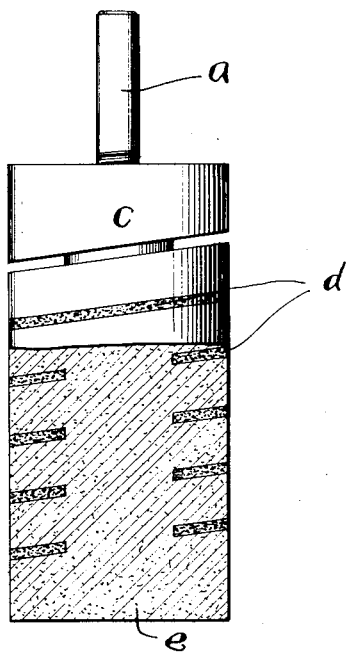
Fig. 6,
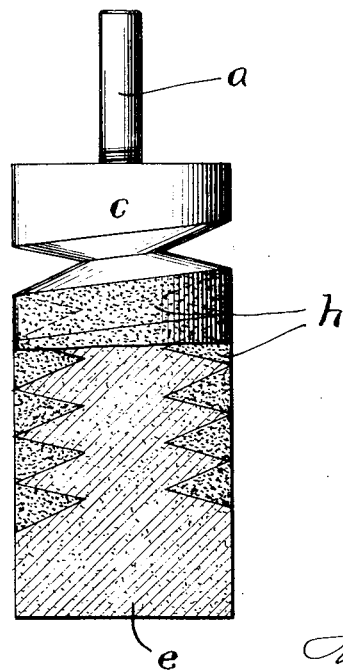

UNITED STATES PATENT OFFICE.

JOSEPH W. RICHARDS, OF SOUTH BETHLEHEM, PENNSYLVANIA.

ELECTRODE.

1,088,296.

Specification of Letters Patent. Patented Feb. 24, 1914.

Application filed May 12, 1913. Serial No. 766,934.

*To all whom it may concern:*

Be it known that I, JOSEPH W. RICHARDS, a British subject, having declared my intention to become a citizen of the United States, and residing at South Bethlehem, Northampton county, State of Pennsylvania, have invented certain new and useful Improvements in Electrodes; and I do hereby declare the following to be a full, clear, and exact description of the invention, such as will enable others skilled in the art to which it appertains to make and use the same.

In electrodes which dip into hot electrolytes, or which serve as terminals or conductors of electricity to or from electric furnaces or other apparatus operated above the ordinary temperature, the power of the electrode or terminal to conduct heat away from the hot apparatus and to disperse it by radiation and conduction, is often a highly important factor in the economic working of the apparatus. Some electrode materials have low heat conductivity but also low electric conductivity; others have high heat conductivity and also high electric conductivity; none are at present known with low heat conductivity and high electrical conductivity, which would be the ideal material to use if it existed.

The object of the present invention is to provide an electrode of satisfactory electrical conductance for the uses referred to, but whose heat conductance, as an electrode, is considerably diminished. The principle employed by me to effect this object is probably mainly based upon the fact that the electricity conducted away from an electrode passes away only at a definite point (where the conductor terminals are clamped or fastened in any other way to the electrode), while the heat conducted away is for the most part dissipated by conduction to the air and radiation from the whole exposed outer surface of the electrode, and usually only a small part of it through the holders or conductor terminals or similar metallic contacts. Since, then, electricity escapes at a definite point on the terminal, while heat escapes all over the exposed surface, this makes possible devices for changing the relative values of its electrical conductance and its heat conductance.

In the accompanying drawing,—Figure 1 illustrates, partly in section and partly in elevation, an electrode embodying my invention, in one of its forms or applications; Fig. 2 represents a transverse sectional view thereof on the line 2—2 of Fig. 1; Figs. 3 and 4 represent, partly in elevation and partly in section, modifications of the form shown in Fig. 1; and Figs. 5 and 6 illustrate a helical arrangement of peripheral recesses.

Similar letters of reference indicate similar parts throughout the several views.

The several forms or modifications illustrated in the drawing are but typical of many others that might be chosen to show the application of the fundamental principle of the invention and its adaptability to practical use. The form of electrode selected for such illustration is an ordinary cylindrical electrode having an electrical connection at its upper end and intended to project at its lower end into the furnace, bath, or other hot apparatus for which it is intended.

The electrode may be connected to the source of current supply in any suitable manner, as, for instance, by a metallic electrical connection $a$ screw-threaded at $b$ into the electrode head $c$. The working end of the electrode is indicated at $e$, and $f$ indicates its outer periphery, more or less of which may be exposed to the air or to the atmosphere of the furnace, as the case may be.

Extending inwardly from the periphery of the electrode are gaps or recesses, preferably continuous, such as may be conveniently made, for instance, by a saw or other cutting tool. These gaps or recesses are indicated in Figs. 1, 2 and 5, at $d$ and are of relatively small breadth. In Fig. 3, the gaps or recesses are indicated at $g$ and in Figs. 4 and 6, at $h$.

The gaps or recesses may be left simply as spaces, freely open to the air, or they may be filled partly or entirely with loose or compressed fibrous, powdery, or solid material of lower heat conductivity than the material composing the substance of the electrode. The practical effect of these gaps or recesses is to reduce to some extent the electric conducting power of the electrode as compared with a plain cylinder of the same outside diameter, but to reduce in a much greater proportion its heat conducting power as regards heat conducted away from the bath, furnace, or the like, and dissipated to the air or surroundings or through metallic contacts. The reason for this effect appears to me, at the present time, to be that the heat currents in a plain cylindrical electrode, supplying the heat losses to the outside, are mainly upward through the outer layers of the electrode, because that is their shortest path to the outside surface, while the electrical currents are either uniform throughout its cross-section or converge toward the center at the top. When such an electrode is provided with gaps or recesses, as in Fig. 1, the electrically conducting cross-section is diminished somewhat in the proportion of the area cut off (but not quite so greatly), while the thermally conducting cross-section is greatly reduced because of the cutting of the outside layers through which most of the main heat currents were flowing. The heat currents are thus forced to take a devious or more extended path to reach the surface than before, and thus the practical heat conducting and dissipating power of the electrode is greatly diminished. Concerning the depth of these gaps or recesses, I have determined by experiment that when they equal in depth (toward the axis of the electrode) their distance apart, the area thus severed from direct current connection still retains approximately one-fourth of its original electrical conductance. If, for instance, as in Fig. 1, the cuts extend two-thirds of the distance toward the center, the un-severed area is one-ninth of the whole, while the severed area is eight-ninths, but since the disconnected area retains effectively one-fourth its original conductance, the whole electrode has $$1/9 + 1/4(8/9) = 1/3$$

of the electrical conductance of a plain cylinder of the same outside diameter. Assuming the electrode end $e$ to be immersed in the bath to the first gap or recess, then the heat conducting power to the outer surface of the first section above $e$ is diminished to about 1/5 of its conductance without the first gap; the next superior section to about 1/4; and, since these are the hottest parts of the electrode surface, the total heat loss is thus very materially less than if the gaps were absent.

Fig. 3 shows the gap or recesses $g$ inclining toward the axis of the electrode; in this manner, still further lengthening the path of the heat currents in reaching the outside periphery $f$ from which the principal heat dispersion occurs, while the electrical conductance is approximately the same as in the form shown in Figs. 1 and 2.

Fig. 4 shows the gaps as peripheral V-shaped cuts, with the interstices filled with suitable poor heat-conducting material. If the electrodes are continuously consumed in the apparatus in which they are used, the poor heat conducting material must be of such composition as not to be harmful to the product of the apparatus; it may, in many such cases, be material such as is being regularly consumed by or fed into the apparatus for treatment, e. g., in the production of aluminium, it may be alumina or other aluminium compounds such as may be useful in the electrolytic bath. In the case of an electrode not being rapidly consumed, a wider choice of the poor heat conducting material placed in the gaps or recesses is permissible.

Fig. 5, illustrates a helical arrangement of the recesses $d$, such as are shown in annular arrangement in Figs. 1 and 2; and Fig. 6, shows a similar helical arrangement of the inwardly narrowing recesses $h$ of the kind shown in annular arrangement in Fig. 4.

In the industrial production of electrodes having forms suitable for utilizing the principles of this invention, various methods are possible. If the electrodes are of soft material or material not too difficult to work, the gaps or recesses may be made as cuts or incisions produced by hand or machine work, upon the electrode itself; e. g., as with graphite or metal electrodes. If the electrodes are molded (as distinguished from being "forced" or "squirted"), the gaps or recesses may be produced in the finished article by embedding strips, washers, or layers of volatile or easily fusible or removable material of suitable poor heat conductivity in the body of the electrode as it is being molded. During the baking, such embedded inclusions either volatilize, decompose, or melt, thus leaving the gaps or recesses at the places desired, or else they remain as layers of easily removable material, or as permanent fillings of poor heat conducting and electrically insulating material, thus constituting an electrode utilizing advantageously the principles of this invention.

In the practical use of this invention, it must not be forgotten that in almost all electric furnaces or apparatus in which high temperatures prevail and electrodes are used, the energy losses by heat flowing out of the apparatus through the electrodes are of very much greater amount and importance than the small energy losses caused by the electrical resistance of the electrodes. It results that very considerable reductions of the electrical conductance of an electrode are practicable and profitable, if at the same time the heat conductance is materially reduced, since the saving in energy lost as heat flow may easily be made to exceed the increased energy required by the increased electrical resistance. It is therefore quite possible, in many instances, to effect a large net saving in electrical energy if, for example, the practical heat conductance of the electrode be diminished say 25 per cent., even though in doing so the electrical conductance be diminished say 50 per cent. or more. The energy losses by heat radiated from electrodes are frequently large and serious, and even a small percentage of saving therein can easily compensate for and more than permit a very considerable increase of their electrical resistance.

Having thus described my invention what I claim is:

1. An electrode provided with heat-retarding gaps or recesses extending inwardly from its periphery transverse to the general direction of heat flow through the electrode; substantially as described.

2. An electrode having encircling heat-retarding peripheral recesses; substantially as described.

3. An electrode having encircling heat-retarding peripheral recesses said recesses narrowing inwardly; substantially as described.

4. An electrode having encircling heat-retarding peripheral recesses containing material of lower heat conductivity than the material constituting the main substance of the electrode; substantially as described.

5. An electrode having heat-retarding peripheral annular recesses; substantially as described.

6. An electrode having heat-retarding peripheral annular recesses containing material of lower heat conductivity than the material constituting the main substance of the electrode; substantially as described.

7. A carbonaceous electrode having heat-retarding gaps or recesses transverse to the general direction of heat flow through the electrode, said heat-retarding gaps or recesses containing a compound of aluminum; substantially as described.

In testimony whereof I affix my signature, in presence of two witnesses.

JOSEPH W. RICHARDS.

Witnesses:
 M. A. BILL,
 H. M. LEWIS.